(12) United States Patent
Ofner

(10) Patent No.: US 6,910,662 B1
(45) Date of Patent: Jun. 28, 2005

(54) AIRCRAFT WING AND WING PARTS MOVABLE ADJACENT TO THE AIRCRAFT WING

(76) Inventor: Anton Gerald Ofner, Koschatgasse 58, A-1190 Wien (AT)

( * ) Notice: Subject to any disclaimer, the term of this patent is extended or adjusted under 35 U.S.C. 154(b) by 0 days.

(21) Appl. No.: 09/959,707
(22) PCT Filed: May 2, 2000
(86) PCT No.: PCT/AT00/00112
§ 371 (c)(1),
(2), (4) Date: Jan. 18, 2002
(87) PCT Pub. No.: WO00/66427
PCT Pub. Date: Nov. 9, 2000

(30) Foreign Application Priority Data

May 4, 1999 (AT) .................................. 793/99

(51) Int. Cl.[7] .................................. B64C 3/44
(52) U.S. Cl. ........................ 244/219; 244/218
(58) Field of Search ................ 244/35 R, 199, 244/218, 219, 34 R, 201, 45 R, 46

(56) References Cited

U.S. PATENT DOCUMENTS

| | | | |
|---|---|---|---|
| 1,559,090 A | * | 10/1925 | Hall |
| 1,775,886 A | * | 4/1930 | McKenzie |
| 1,924,871 A | | 8/1933 | Ludington |
| 2,969,207 A | * | 1/1961 | Fain et al. |
| 3,136,501 A | * | 6/1964 | Barber |
| 3,184,187 A | * | 5/1965 | Isaac |
| 3,447,768 A | * | 6/1969 | McQueen |
| 4,341,176 A | * | 7/1982 | Orrison |
| 4,485,991 A | * | 12/1984 | Fuller |
| 4,890,803 A | | 1/1990 | Smith |
| 6,138,957 A | * | 10/2000 | Nastasi et al. |

FOREIGN PATENT DOCUMENTS

| | | | |
|---|---|---|---|
| DE | 20 26 054 | 12/1970 | |
| DE | 23 53 245 | 4/1975 | |
| FR | 781467 | * 5/1935 | ................. 244/219 |
| FR | 2049028 | 3/1971 | |
| IT | 337121 | * 2/1936 | ................. 244/219 |
| WO | 93/19978 | 10/1993 | |

* cited by examiner

*Primary Examiner*—Tien Dinh
(74) *Attorney, Agent, or Firm*—Young & Thompson

(57) ABSTRACT

Wing parts (20, 21) which influence the lift of aircraft wings (1), especially wings (1) with a cross section and an angle of attack which is suitable for high-speed flight, which parts can be moved out of an aerodynamically inactive servicing position within the aircraft fuselage (30) or out of chambers (40) mounted on the wings (1) into an aerodynamically efficient active position and from the active position back into the servicing position, are assigned to the wings (1). These wing parts (20, 21) in their active position are located on the top (3) and optionally also on the bottom (4) of the wings (1) and are shaped for example such that the wing parts (21) located in their active position on the bottom (4) of the wings (1) jointly with the wing parts (20) located in their active position on the top (3) of the wings (1) increase the lift and optionally at the same time change the angle of attack of the wing.

18 Claims, 8 Drawing Sheets

AIRCRAFT WING AND WING PARTS MOVABLE ADJACENT TO THE AIRCRAFT WING

BACKGROUND OF THE INVENTION

The invention relates to an aircraft wing, especially a wing with a cross section which is suitable for high-speed flight and an angle of attack, the wing parts which influence the wing lift and which can be moved from an aerodynamically inactive servicing position to an aerodynamically efficient active position and from the active position back into the servicing position, being assigned to the wings.

According to Bernoulli's Law, gases which increase their flow velocity reduce their pressure. Winged aircraft use this physical principle. FIG. 1 shows in cross section a conventional wing 1 with a given angle of attack 2. The top 3 of the wing 1 is arched to the outside. The air flow 5 streaming over the wing 1 on the top 3 must traverse a greater (longer) path than on the bottom 4 of the wing 1. The underpressure (lift arrows 7 in FIG. 1) thus resulting on the top 3 of the wing 1 equalizes the weight of the aircraft in horizontal flight and keeps it in the air.

By changing the speed, by choosing the angle of attack 2 and/or the aerodynamically efficient surface of the wings, the behavior in flight can be influenced. The lift which is formed on the wing of an aircraft is directly proportional to the area exposed to the air flow and proportional to the square of the speed of the air flow streaming over this wing. Furthermore, the lift is roughly proportional to the angle of attack of the wing as long as it remains in the range of roughly +/−14 degrees. Larger angles lead to so-called "stalling", i.e. to separation of the air stream over the wing.

Aircraft designers try to produce the best possible ratio of lift and drag. But since this ratio is dependent on various factors such as the weight of the aircraft or the speed of the air streaming over the aerodynamically efficient aircraft parts, the attempt is made to match the lift and drag of aircraft to the conditions or applications prevailing at the time. A transport aircraft designed for subsonic operation has a lift-drag ratio of roughly 20, a glider on the other hand has a ratio of 30 or more. In supersonic flight the attainable ratio of lift/drag drops to below 10.

Winged aircraft should be able to change their aerodynamic lift behavior to meet the aerodynamic and economic requirements of low-speed and high-speed flight, increased or reduced payload, optimization of range and fuel consumption and use of long or short runways.

In the prior art, measures have been proposed for changing the lift of aircraft wings and adapting to different situations. One proposal consists in using inflatable wings or wing parts.

Other proposals (DE 20 26 054 B) relate to movable parts within the wings which are designed to change their profile by arching the (flexible) outside skin of the wing. Both possibilities are suitable, if at all, only for light, slow-flying, winged aircraft. Another, still extraordinarily complex and therefore expensive possibility is tiltable wings.

FIG. 2 shows the currently most common measures for changing the lift of a wing, specifically using landing flaps (underwing flaps) 10. These landing flaps 10 develop their action by their lengthening the rear, often also the front part of the wing 1 to the bottom. In this way the lift-generating profile on the top 3 of the wing 1 is also lengthened. This increases the lift 7. But since on the bottom 4 of the wing 1 when the angle of attack 2 is not changed a cavity 12 is formed, strong turbulence 13 forms in flight and leads to the known "buffeting" of the aircraft with the flaps 10 extended, therefore for example in the landing approach.

These landing flaps 10 are conventionally integrated into the wings and are extended on them if necessary, but can also be accommodated as described in DE 23 53 245 C in one or more chambers in the fuselage of the aircraft and from there are moved into their operating position near the wing edges (front edge and rear edge) But since in this as in all other types of application of lift flaps which act on the front and/or rear edges of the wings the remaining wing profile and the angle of attack remain unchanged, narrow limits are imposed on this form of changing lift.

For technical reasons and for reasons of stability of the takeoff and landing configuration the surface enlargement cannot exceed a certain amount, the required wing cross section cannot fall below a certain amount and the angle of attack of the wing cannot be changed. The cross section and length of the wing must maintain a certain minimum. For reasons of efficiency, but at the cost of likewise desirable versatility with reference to their characteristics, therefore aircraft types which are matched to relatively narrow applications have been developed. Attempts to increase the versatility of possible applications with existing, possibilities (VTOL, STOL, tilt wing aircraft and convertiplanes) are less economical and also not satisfactory in the aerodynamic properties attainable to date because they are extremely expensive.

U.S. Pat. No. 4,890,803 A shows and describes an aircraft wing of the initially mentioned type which has on its top a step which extends essentially over its entire length. The height of this step on the top of the wing can be changed by swivelling a "flap" to change the aerodynamic properties of the wing. In the embodiment shown in FIG. 4 of U.S. Pat. No. 4,890,803 A the flap in the lengthwise direction of the aircraft wing can be adjusted to move it into a receiving space in the lower part of the fuselage of the aircraft or out of it again. Thus it will become possible, in addition to swivelling the flap around the axis which lies in the area of the rear edge of the wing, to also change its effective size (length) in order to change the lift force, therefore the aerodynamic properties of the wing.

SUMMARY OF THE INVENTION

The object of the invention is to make available aircraft wings of the initially mentioned type with an aerodynamically efficient profile and optionally also with an angle of attack which can be changed.

With the invention the aerodynamically efficient profile and if desired the angle of attack of the aircraft wings can be changed by at least one wing part per wing which can be moved out of the fuselage of the aircraft and/or out of containers attached to the wings themselves along the wing and can be matched to various requirements.

At least one (per wing) wing part as claimed in the invention can consist of several parts which can be stacked into one another or can be made to be telescopically extensible. The extensible wing part can also consist of only one element which surrounds the entire circumference of the fixed wing over a section, over its entire length, or projecting over it.

As claimed in the invention, preferably several aerodynamically efficient wing parts which can be used either alone or jointly to change the profile and optionally also the angle of attack of the wing in which they are located are assigned to the wings. Preferably the wing parts assigned to the top of the wing in their active position increase the lift of the wing. The additional wing parts which are optionally present and which are assigned to the bottom of the wing are used to increase stability in their active position, improve aerodynamic properties and mainly together with the wing parts assigned to the top of the wing to change the angle of attack of the wing, especially to increase it.

It can also be provided that the extensible wing parts can be moved independently of parts of the other wing so that they can be used not only for (bilateral and synchronous) change of the lift and optionally of the angle of attack of the wing, but when moved unilaterally, jointly with the control surface, also for control purposes.

The aerodynamic properties of wings which can be achieved as claimed in the invention can be changed instead of or in addition to the conventional underwing or landing flaps or other measures for changing the aerodynamic properties of wings.

With the invention, wing parts for wings are made available which have especially a cross section which is suitable for high-speed flight and an angle of attack which is suitable for high-speed flight. When using the aircraft in high-speed flight the wing parts as claimed in the invention are located in a servicing position in which they are held for example within the aircraft fuselage or in or on containers provided on the wings. For low-speed flight the wing parts as claimed in the invention are moved out of the aircraft fuselage or the containers on the wings into their active position, especially extended along the wings into their active position and they change the shape of the wing and thus its lift. For wing parts in the active position the aerodynamically efficient profile is determined by the profile of the wings and by that of the wing parts. In the invention the wing parts in their aerodynamically efficient position can change the profile of the wings as the angle of attack of the wing remains the same. In addition, the wing parts, especially the wing parts which are assigned to the bottom of the wings, can change the angle of attack of the wings.

The wing parts as claimed in the invention or (if there are two or more wing parts per wing) individual wing parts can surround the wings entirely or partially on a selectable section or can project on its front or rear edge and/or on the wing tips over the latter.

In order to accommodate the wing parts provided as claimed in the invention in a space-saving manner, they can be stacked into one another or can be telescoped into one another in the retracted state (servicing position) in the receiving spaces provided in the vehicle fuselage and/or in containers which are mounted on the wings.

In the invention the wing parts can be extended into their active position which changes the aerodynamically efficient profile and/or the angle of attack of the wing, out of the aircraft fuselage and/or out of the containers mounted on the wings at the same time. But there is also the possibility of moving the wing parts staggered in time, both out of the fuselage and also out of the containers attached to the wings into their active position.

It goes without saying that the wing parts as claimed in the invention do not preclude the wings equipped with them having means known in the prior art, such as landing flaps.

The wing parts provided as claimed in the invention can be used instead of or jointly with known devices attached to the wings for controlling and/or trimming the aircraft.

The wing parts provided as claimed in the invention can be composed of one piece or of several parts which each can be moved jointly or for itself, and which in their active position develop the desired aerodynamic efficiency.

The connection between the wing parts and wings can take place regardless of whether there is one wing part or two or more wing parts per wing, by holding means which form-fit into one another for example (groove-rib pairs).

It is advantageous if the wing parts as claimed in the invention in their servicing position with their front end surface form one part of the outside covering of the aircraft fuselage or part of the side wall of the containers in which they are held.

At least one wing part which is provided as claimed in the invention per wing can project above the existing wing in at least one direction. Thus the wing part can project over the wing forward, to the rear, or over the end of the wing facing away from the aircraft fuselage. Here wing parts are preferred which project over the wing on its front edge and/or on its rear edge.

The wing parts provided as claimed in the invention can be formed on their surfaces facing the wings of an aircraft such that they adjoin them flat or only partially. Here it is preferred that at least one wing part adjoins the wing, especially forward, so that there is no gap between the wing part and the wing on its front edge.

When the wing parts provided as claimed in the invention consist of several parts, they can be moved independently of one another in order to move them out of their servicing position into their active position. Here the wing parts can also made such that for example the wing parts assigned to the top of the wing are divided in the lengthwise direction, and have one section each which is assigned to the front edges of the wings, and one section each which is assigned to the rear edges of the wings.

It is preferably that when there are several wing parts they are coupled to one another; this is especially preferred for example when there are wing parts which are assigned to the top and the bottom of the wings. In this case it is preferred if the wing parts on their front edge and/or on their back edge are connected to one another; this especially when the wing parts project over the wings on their front edges and/or rear edges and do not adjoin the wings flat.

The invention achieves this object by moving one or several, then preferably telescoping element(s) out of the servicing position into an aerodynamic active position, by which at the same time the cross section of the wing and/or its angle of attack can be changed. At least one extensible wing part can is consist of a part which surrounds one section or the totality of the fixed wing and projects over it and is thus formed such that in the active position an altered wing cross section and/or angle of attack is formed, or can consist of several component profiles which together yield the desired overall profile and the new angle of attack of the wing in the low-speed flight configuration. The approach as claimed in the invention enables an economically simple construction (flaps and ailerons can be saved), is mechanically without problems and is statically unobjectionable (the fixed wing supports the movable parts in each phase) and allows a basic and simultaneous change of the wing profile and/or angle of attack and control pulses by asynchronous motion of the movable parts in the active position.

BRIEF DESCRIPTION OF THE DRAWINGS

Other details and features as well as advantages of the invention result from the following description of embodiments of the invention using the drawings.

DETAILED DESCRIPTION OF THE PREFERRED EMBODIMENTS.

Figure 1:
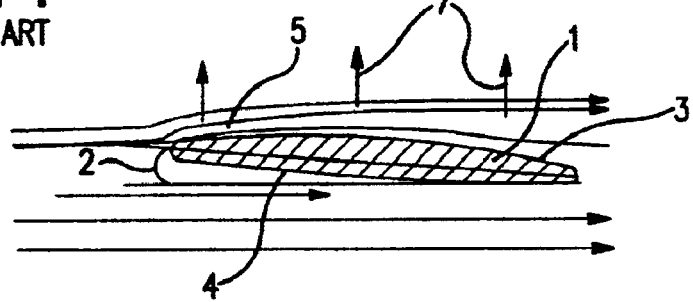
FIG. 1 shows in cross section a prior art wing.
Figure 2:
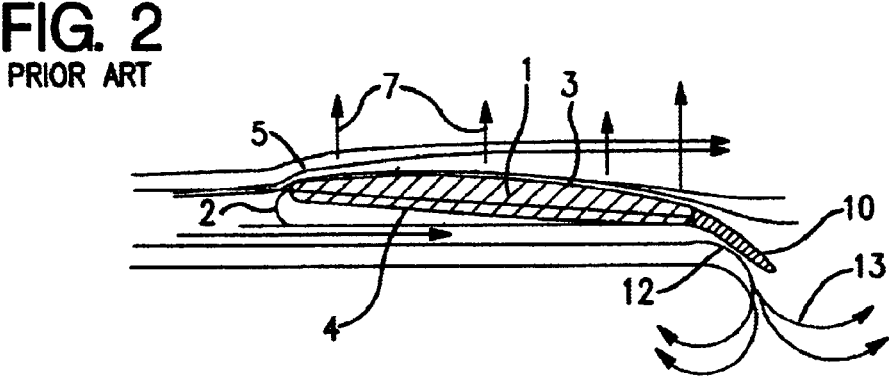
FIG. 2 shows in cross section a prior art wing having landing flaps.
Figure 3:
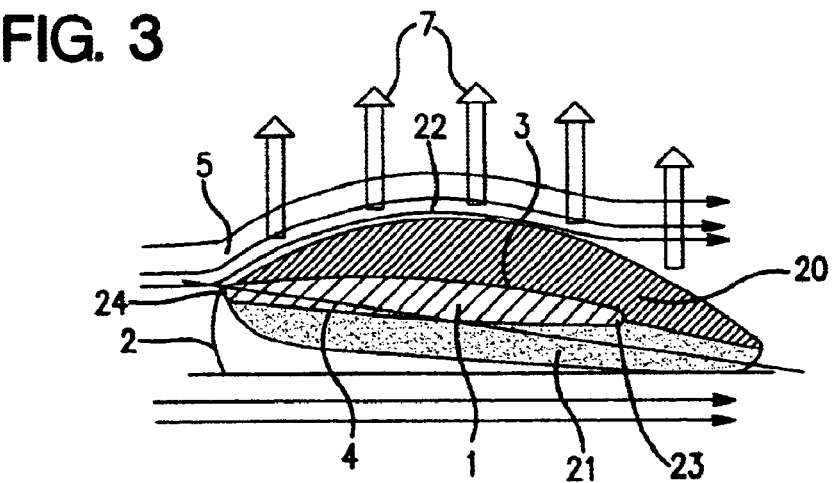
FIG. 3 shows in cross section a wing with wing parts which are assigned to its top and its bottom.

FIG. 3 shows in one embodiment how the wing parts 20 and 21 as claimed in the invention can be assigned to the top 3 and the bottom 4 of a wing 1.

By extending (or swivelling out) the two wing parts 20 and 21 which are aerodynamically efficient in the example from FIG. 3 out of the aircraft fuselage the aerodynamically efficient cross section of the wing 1 is changed. This yields a large, aerodynamically usable arch of the (upper) wing surface 22 and thus a wing profile which is flow-optimized for low-speed flight and which is composed in an aerodynamically efficient manner of wing parts 20, 21 and the wing 1.

FIG. 3 shows as an example that two aerodynamically efficient wing parts 20 and 21 in the extended state surround the wing 1 over a selectable length and project over the rear wing edge 23. The wing parts 20 and 21 as claimed in the invention can extend over part or over the entire length of the wing 1 or can project laterally over it.

Figure 24:
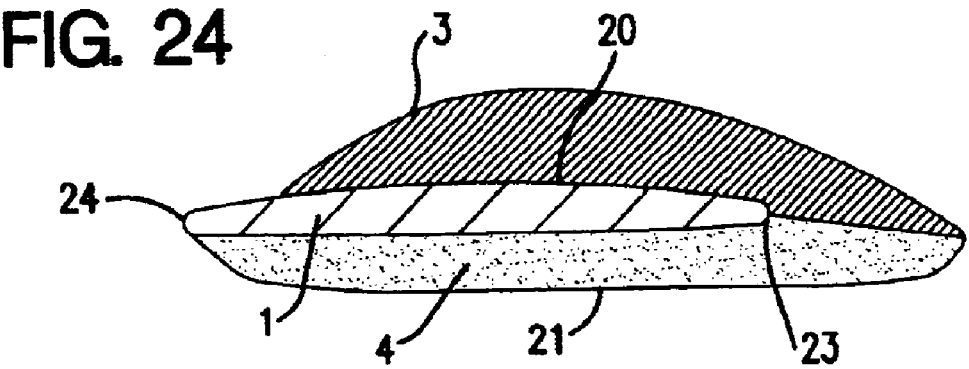
Figure 25:
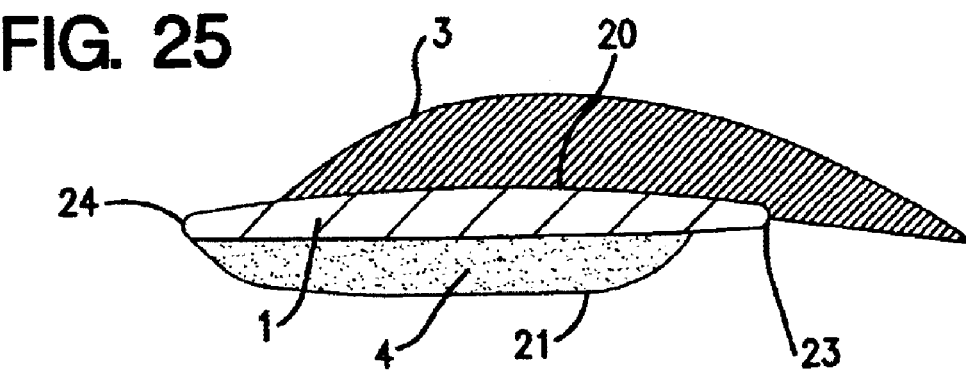

Furthermore, the wing parts 20 and 21 (or only one of them) can extend from the front edge 24 of a wing 1 to its rear edge 23 (see FIG. 3) or the wing parts 20 and 21 (or only one of them) end at a distance from the front edge 24 and/or the rear edge 23 of the wing 1 (they project or they do not extend as far as the front or rear edge) (See FIGS. 24 and 25).

Here the wing parts 20 and 21 generate a higher lift 7 than the wing 1 by itself.

The wing parts 20, 21 are made in the example from FIG. 3 in their cross sectional shape such that in the extended state they yield a modified overall wing profile. This also increases the angle of attack 2 of the wing 1. The resulting aerodynamic characteristics allow (extremely) low-speed flight with high stability, conveyance of large payloads or use of (extremely) short runways. After retracting the movable wing parts 20, 21 only the relatively short (basic) wing 1 which is designed in its cross sectional angle of attack for high speeds remains aerodynamically efficient. The low drag generated in this way enables high speeds with long ranges and high fuel efficiency for the same aircraft.

According to Bernoulli's Law, for flight in the slower speed range the droplet shape is the optimum shape of the cross section of a wing. But this applies only to flight speeds in the subsonic range. When the sound barrier is approached or broken this shape is a barrier since the shock waves with high amplitude which form when approaching the sound barrier produce a very large amount of drag. At the speed of sound these shock waves form roughly a plane. At Mach 1.4 the shock wave angle is roughly 90 degrees, at roughly Mach 2.5 roughly 50 degrees.

According to the area rule of Richard Travis Whitcomb the air resistance of an aircraft at speeds near the sound barrier depends on the distribution of the overall cross sectional area along the aircraft. To reduce this drag at or above the sound barrier, the attempt is made to make the end face opposite the oncoming air as small as possible. For this reason high speed aircraft have wings with narrow, blade-shaped front edges, a slender fuselage and a wing cross section as small as possible.

In order for the wing ends to avoid shock waves which run conically to the rear and which build up as the sound barrier is approached, these aircraft often have a pronounced arrow shape of the wings (for example, McDonnell Douglas F15).

Since with known landing flaps the aerodynamic properties of wings can be changed only to a limited extent, these construction features result in the payload being low, the range being short and the take-off and landing speed being high. In the slower speed range and/or at higher payloads the required lift cannot be produced. Therefore very short runways cannot be used. In the slow speed range the described wing configuration is suboptimum. Aircraft for both subsonic and supersonic flights (for example the Rockwell B-1B or the Concorde) currently represent compromises of efficiency both in the subsonic and supersonic speed range. The invention solves this problem.

Figure 4:
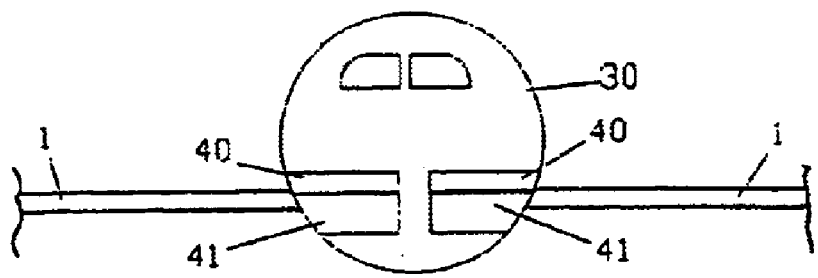
FIG. 4 shows in a view from the front an aircraft with two retracted wing parts per wing, FIG. 5 the aircraft with the retracted wing parts, wing parts made in two parts being assigned to the top of the wing and wing parts made in three parts being assigned to the bottom.

FIG. 4 schematically shows viewed from the front an aircraft with a fuselage 30 and two wings 1, the receiving spaces 40 and 41 being shown for aircraft parts in their servicing position, therefore in their inactive position.

Figure 5:
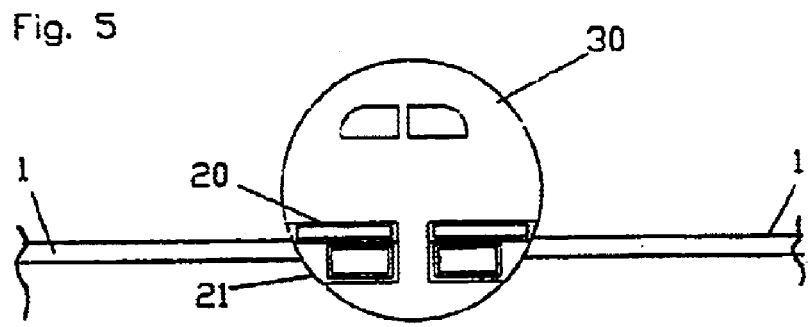

FIG. 5 shows the aircraft from FIG. 4, the wing parts 20 and 21 being shown in the receiving spaces 40, 41.

Figure 6:
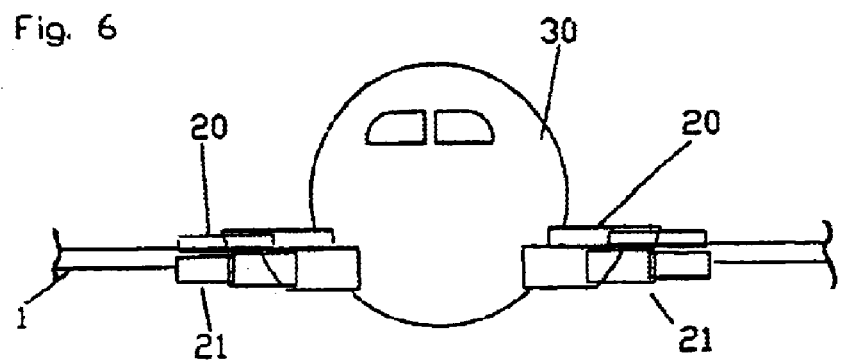
FIG. 6 shows the aircraft with the wing parts entirely extended, FIG. 7 schematically shows one aircraft with two wings and two wing parts which are assigned to the top of the wings.

FIG. 6 shows the aircraft from FIGS. 4 and 5, both the wing parts 20 on the top 3 of the wing 1 and also the wing parts 21 on the bottom 4 of the wing being extended into their active position.

FIGS. 5 and 6 show that each of the wing parts 20 and 21 in this example consists of several parts which in their servicing position are telescoped into one another in the receiving spaces 40 and 41. In their active position shown in FIG. 6 the individual parts of the wing parts 20 and 21 are moved apart from one another in order to achieve an effective length thereof which is as large as possible.

It goes without saying that in the embodiment shown in FIGS. 4 to 6 the wing parts 20 and 21 can extend to the (not shown) tips of the wings 1 or can project over them.

Figure 7:
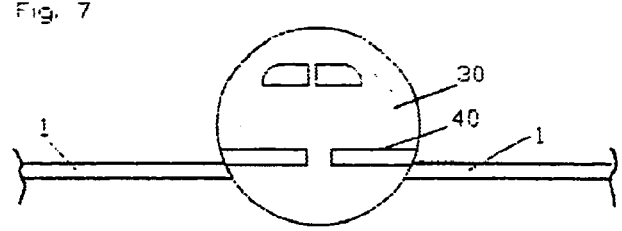
Figure 8:
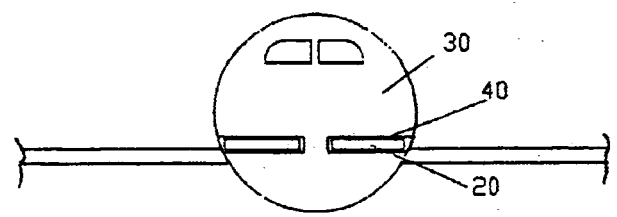
FIG. 8 shows an aircraft with two telescoping wing parts which lie on the top in the servicing position.
Figure 9:
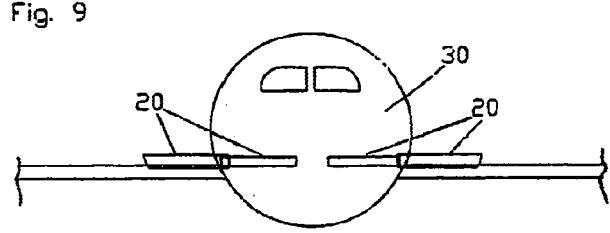
FIG. 9 shows an aircraft with only one extended wing part per wing.

FIG. 7 to 9 show an embodiment in which in the fuselage 30 of an aircraft with two wings 1 there are simply two receiving spaces 40 for the wing parts 20. These wing parts 20 can be extended out of the servicing position (inactive position) shown in FIGS. 7 and 8 into their active position as shown in FIG. 9, FIG. 9 showing that the wing parts 20 can also be only partially extended.

FIGS. 7 to 9 also show that the outer ends of the wing parts or parts thereof form part of the covering (outside skin) of the aircraft fuselage 30. This is also shown for the other embodiments as shown in FIGS. 4 to 16 and 10 to 17 in this way. This embodiment yields the advantage that when the wing parts 21 have been withdrawn into their servicing position a smooth and streamlined outside shape of the fuselage 30 is preserved.

Figure 10:
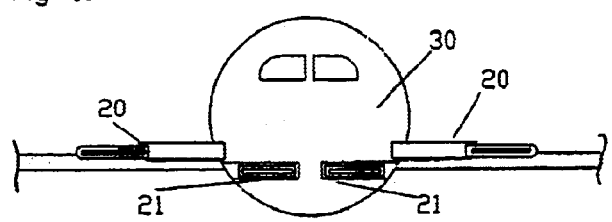
FIG. 10 and 11 show an aircraft with two wings, the wing parts being assigned to the top and the bottom of the wings and not extended or extended partially or entirely.
Figure 11:
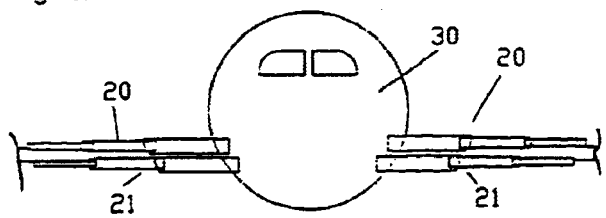

FIG. 10 shows that the wing parts 20 and 21 can also only be partially extended, in the position shown in FIG. 10 the wing parts 20 assigned to the top 3 of the wing 1 being partially extended, and the wing parts 21 assigned to the bottom 4 of the wing 1 not being extended at all. FIG. 11 shows that it is possible to completely extend the wing parts 20 and 21 if necessary.

Figure 12:
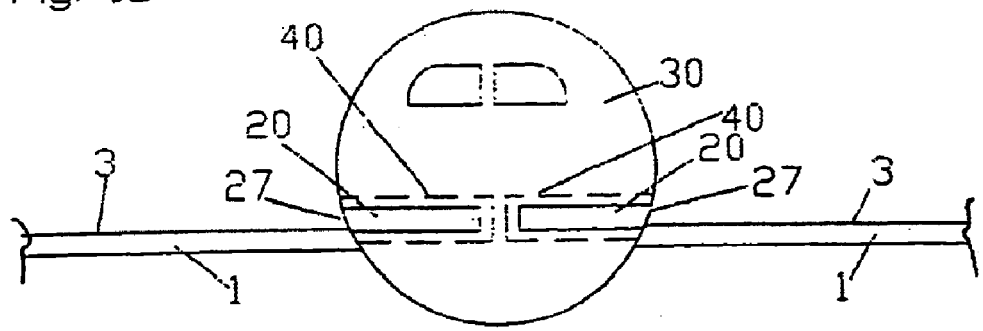
FIG. 12 to 14 show another embodiment with wing parts which are only partially extended or are not extended.
Figure 13:
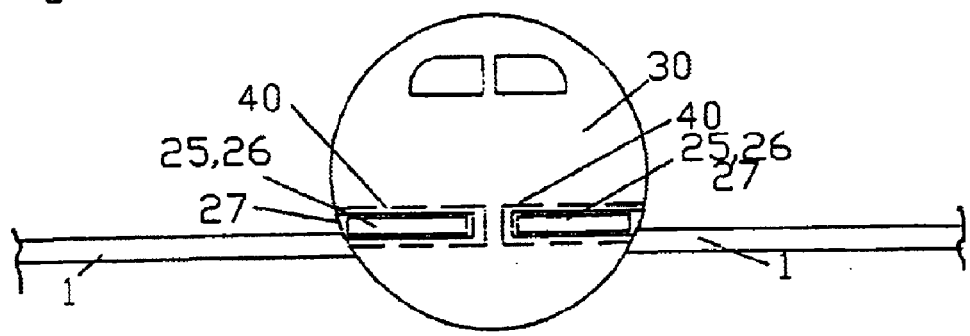
Figure 14:
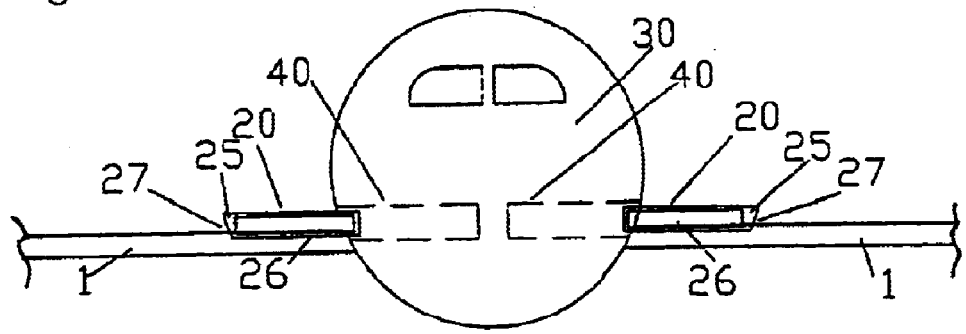

FIGS. 12 to 14 show one embodiment of an aircraft with a fuselage 30 and wings 1, there being only the wing parts 20 assigned to the top 3 of the wings 1. These wing parts 20 are shown in FIG. 12 in their servicing position, therefore in the receiving spaces 40, its also being shown in FIG. 12 that the outer end surfaces 27 of one part 25 of the wing parts 20 which accommodates the second part 26 which has been telescopically retracted, in the servicing position shown in FIG. 12 form a closure for the receiving spaces 40 which is flush with the outside skin of the aircraft fuselage 30.

Figure 15:
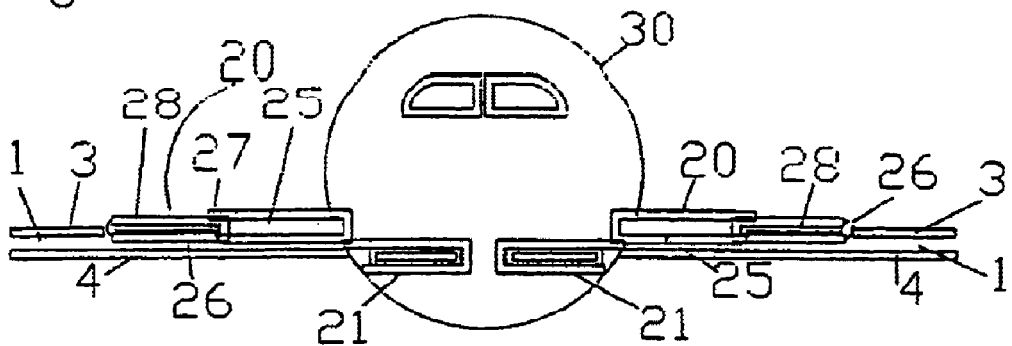
FIG. 15 shows one embodiment of an aircraft with wing parts which can be moved into position on the top and bottom of the wing.
Figure 16:
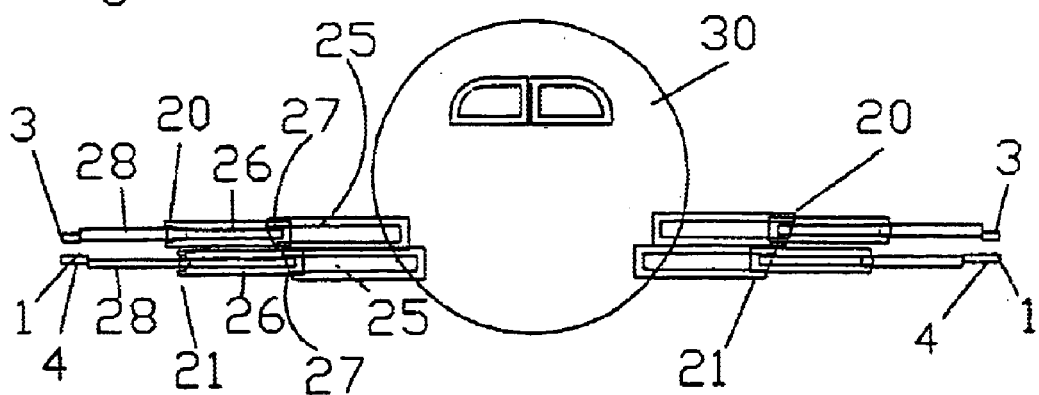
FIG. 16 shows the aircraft from FIG. 15, the wing parts assigned to the bottom of the wing being extended as well.

FIGS. 15 and 16 show one embodiment of the aircraft with a fuselage 30 and two wings 1, the wing parts 20 and 21 being assigned to the wings 1. The wing parts 20 are partially extended in the position from FIG. 15, conversely the wing parts 21 which are assigned to the bottom 4 of the wing 1 are held in their servicing position within the fuselage 30 of the aircraft. FIG. 16 shows the aircraft from FIG. 15 with the completely extended wing parts 20 and 21 which can each consist of three parts 25, 26 and 28 which can be pushed into one another (for example, which can be telescoped into one another).

Figure 17:
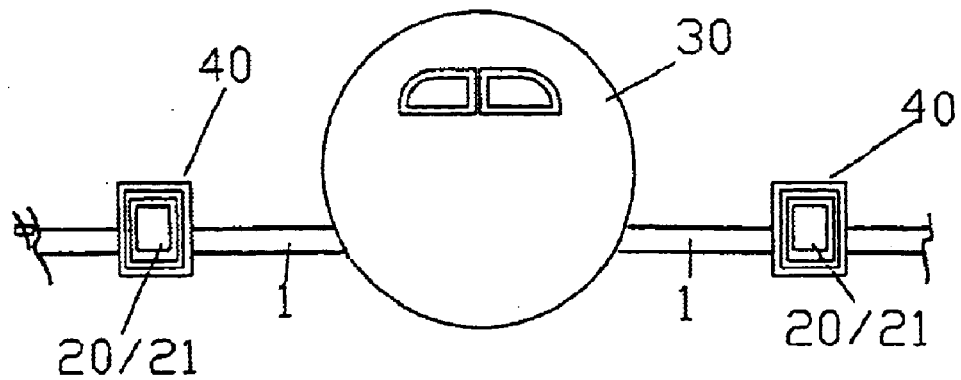
FIG. 17 shows one embodiment (schematically) with containers located on the wings for accommodating wing parts, FIGS. 18 to 22 in cross section show wings with the wing parts assigned to them in different embodiments and FIG. 23 show another embodiment, and FIGS. 24 and 25 in cross section show wings with the wing parts assigned to them in further different embodiments.

FIG. 17 shows one embodiment of an aircraft with a fuselage 30 and wings 1, the wing parts 20, 21 for changing the aerodynamically efficient cross section of the wings 1 being housed in containers 40 (servicing position) which are mounted on the wings 1.

FIGS. 18 to 23 show different embodiments of wing parts on wings 1 as claimed in the invention in cross section.

Figure 18:
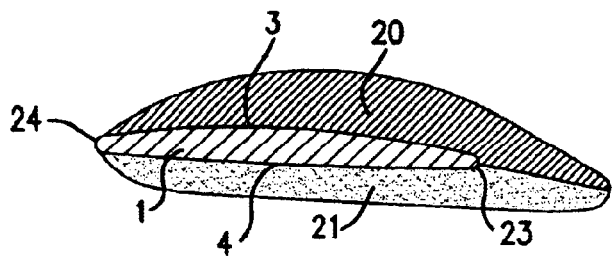

FIG. 18 shows one embodiment in which a wing part 20 which adjoins the top 3 of the wing 1 and a wing part 21 which adjoins its bottom 4 are assigned to the wing 1. The wing parts 20 and 21 of FIG. 18 extend from the front edge 24 of the wing 1 to the rear and project over the rear edge 23 of the wing 1, the wing parts 20 and 21 in the area projecting above the rear edge 23 of the wing 1 adjoining one another and preferably being connected to one another there.

Figure 19:
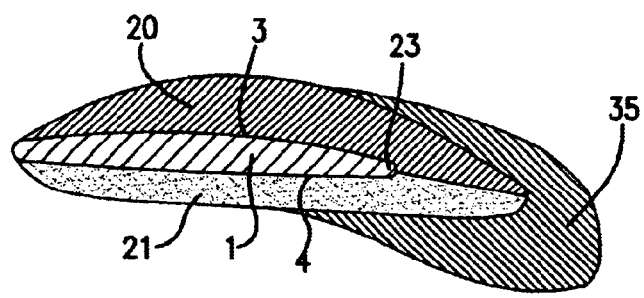

FIG. 19 shows one modification of the embodiment form FIG. 18, in addition to the two wing parts 20 and 21 there being an additional wing part 35 which surrounds the two wing parts 20 and 21 in the area of the rear edge 23 of the wing 1. The additional wing part 35 in combination with the wing parts 20 and 21 yields an aerodynamically efficient profile cross section which is especially suitable for extremely slow speed flight. The additional wing part 35 can be moved at the same time with the wing parts 20, 21 into its active position. But it is also possible the move the additional wing part 35 into its active position after the wing parts 20, 21 have already been moved into their active position.

Figure 20:
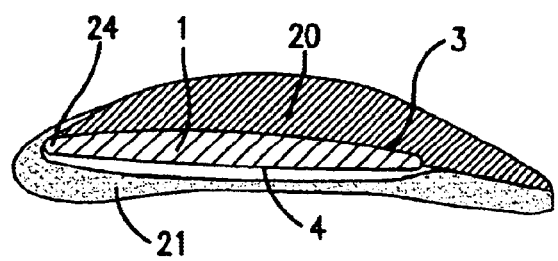

In the embodiment shown in FIG. 20 the wing part 20 is made resting flat on the top 3 of the wing 1, conversely the wing part 21 is located on the bottom 4 of the wing 1 at a distance from it. In the area of the front edge 24 of the wing 1 the wing part 21 surrounds the front edge 24 of the wing 1 and projects as far as the area (front area) of the wing part 20 located there.

Figure 21:
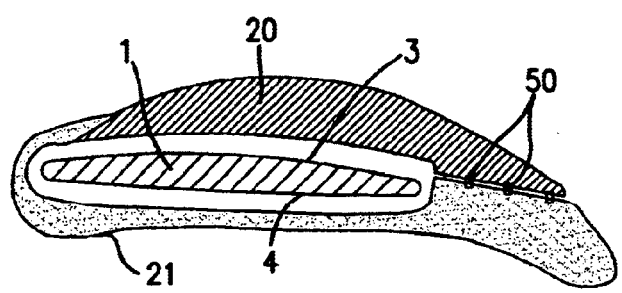

FIG. 21 shows a similar embodiment to FIG. 20, the wing part 20 located above the wing 1 being likewise located at a distance from the top 3 of the wing 1. FIG. 21 also shows that the wing parts 20 and 21 in their area which projects over the wing 1 to the rear adjoin one another and can be connected to one another by connecting means 50.

Figure 22:
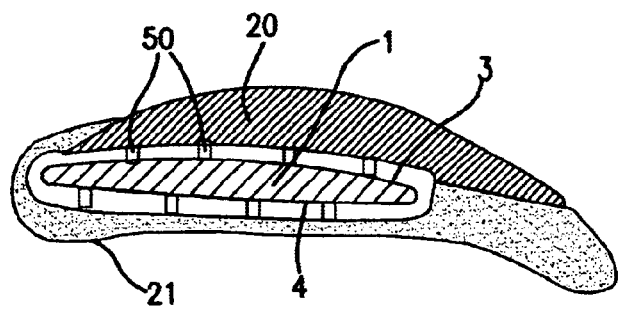

FIG. 22 shows an embodiment similar to FIG. 21, connecting means 50 being schematically shown between the wing 1 and the wing parts 20 and 21.

These connecting means 50 can be provided in all the illustrated embodiments of wing parts 20, 21 and in the additional wing parts 35, and they are preferably connections which fit into one another by form-fit and which allow relative displacement of the wing parts 20, 21 (and 35) to one another and relative to the wing 1. For example there are grooves undercut in the wings 1 (for example, grooves with keyhole-shaped cross section) into which fit the coupling strips provided on the wing parts with the corresponding cross section, for example, with a keyhole shape cross section, and they can be moved in the lengthwise direction. There can also be similar connecting means which fit into one another by form-fit and which allow relative motion in the direction of the lengthwise extension of the wings, between the individual parts 25, 26, 28 of the wing parts 20, 21.

Figure 23:
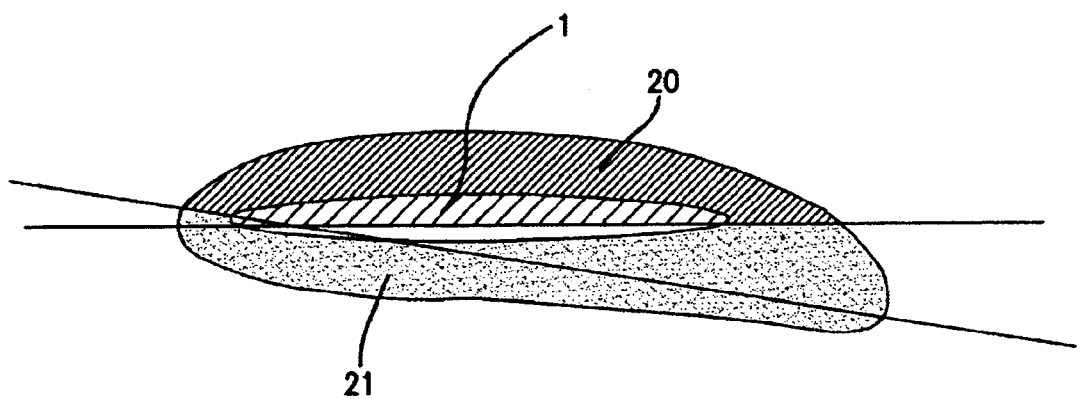

FIG. 23 shows one embodiment in which at least one wing part 20 which is assigned to the top of the wing 1 is made in one piece with at least one wing part 21 which is assigned to the bottom of the wing 1 or is connected to it (rigidly). In this embodiment, between the wing 1 and the wing parts there can also be a distance to the top and/or bottom (compare FIGS. 20 to 22).

The wing parts 20, 21 can be extended out of the receiving spaces 40, 41 or the containers into their active position.

Wing parts which can be housed in containers 40 on the wings 1 can be combined with wing parts which are provided in the receiving spaces 40, 41 in the fuselage 30 of the aircraft.

The wing profile can be almost freely configured by the aerodynamically efficient wing parts 20, 21 which can be extended out of the fuselage 30 or out of the receiving spaces or containers 40 mounted on the wings 1 and optionally also by the additional wing parts 35. This means that in the high-speed flight configuration (with the wing parts 20, 21 retracted into the servicing position) with a very small wing span and with a very small wing cross section and narrow front edge of the base wing 1 very high speeds can be achieved. In the slow-speed flight configuration with the wing parts in the active position an overall large wing cross section which cannot be achieved with existing measures and thus also high aerodynamic lift can be achieved. Conversely, with the wing parts 20, 21 retracted no unwanted lift or drag and no undesirably high angle of attack oppose very high speeds. The short wing spans which are possible when using the wing parts as claimed in the invention prevent the ends of the wings from projecting into the shock waves which form as the sound barrier is approached or crossed and thus prevent the stability of the aircraft from being adversely affected.

The effects of the execution of aircraft wings as claimed in the invention with wing parts are the following, for example:

At low speeds and/or for short runways and/or high payloads the wing parts 20, 21 as claimed in the invention and optionally the additional wing parts 35 are completely extended to produce the greatest amount of lift.

When higher speeds are reached the wing parts are retracted and are largely or completely held in the fully retracted state in the fuselage or in the receiving spaces/containers located on the wings. Then only the very short basic wing provided with a very small cross section and a small angle of attack, and if provided, the containers 40 for the wing parts 20, 21 mounted on the wings 1, remain aerodynamically efficient.

Thus top speeds are possible which can otherwise not be reached with the conventional wing profiles and angles of attacks designed for use in the subsonic range.

In summary, one preferred embodiment of the invention can be described as follows:

Wing parts 20, 21 which influences the lift of aircraft wings 1, especially wings with a cross section and angle of attack suited for high speed flight, are assigned to these wings and they can be moved out of an aerodynamically inactive servicing position within the aircraft fuselage 30 or out of the chambers 40 mounted on the wings 1 into an aerodynamically efficient active position and out of the active position back into the servicing position. These wing parts 20, 21 are located in their active position on the top 3 and optionally also on the bottom 4 of the wings 1 and are shaped for example such that the wing parts 21 located in their active position on the bottom 4 of the wings 1 preferably together with the wing parts 20 located in their active position on the top 3 of the wings 1 change the lift and optionally at the same time the angle of attack of the wing, especially increase it.

What is claimed is:

1. An aircraft comprising:

a fuselage;

an aircraft wing connected to said fuselage; and at least one wing part that is slidably movable from an aerodynamically inactive servicing position within said fuselage to an aerodynamically efficient active position adjacent to said aircraft wing, said at least one wing part extending at least over a greater part of a width of the wing from the leading edge to a trailing edge in said active position.

2. The aircraft according to claim 1, wherein said at least one wing part in the active position is slidable over a top of the aircraft wing.

3. The aircraft according to claim 1 wherein said at least one wing part in the active position is slidable over a bottom of the aircraft wing.

4. The aircraft according to claim 3 further comprising at least two wing parts, one of said at least two wing parts in the active position is slidable over the bottom of the aircraft wing and another one of said at least two wing parts is slidable over a top of the aircraft wing to increase an angle of attack of said aircraft wing.

5. The aircraft as claimed in claim 1, wherein said at least one wing part extends from a front edge to a rear edge of the aircraft wing.

6. The aircraft as claimed in claim 1, wherein said at least one wing part extends from a front edge of the aircraft wing and projects to a rear of the aircraft wing and extends over a rear edge of the aircraft wing.

7. The aircraft as claimed in claim 1, wherein said at least one wing part extends over an entire length of the aircraft wing.

8. The aircraft as claimed in claim 1, wherein said at least one wing part projects over an outer end of the aircraft wing.

9. The aircraft as claimed in claim 1, wherein said at least one wing part comprises a plurality of sections.

10. The aircraft as claimed in claim 9, wherein said plural sections are telescopically connected.

11. The aircraft as claimed in claim 1, wherein a surface of said at least one wing part facing the aircraft wing is congruent to a profile shape of a top of the aircraft wing.

12. The aircraft as claimed in claim 1, wherein said at least one wing part adjoins a top of the aircraft wing.

13. The aircraft as claimed in claim 1, wherein said at least one wing part is located at a distance from a bottom of the aircraft wing.

14. The aircraft as claimed in claim 1, wherein said at least one wing part is located at a distance from a top of the aircraft wing.

15. The aircraft as claimed in claim 1, further comprising another aircraft wing, wherein said at least one wing part co acting with said aircraft wing is movable into the active position independently of another wing part co acting with said another aircraft wing.

16. A combination of an aircraft wing and a storage compartment containing at least one wing part that is retractably telescopically slidable over an exterior surface of said aircraft wing, said at least one wing part extending at least over a greater part of a width of the wing from a leading edge to a trailing edge.

17. The combination as claimed in claim 16, wherein said storage compartment is in an aircraft fuselage.

18. An aircraft comprising:

a fuselage;

first and second wings on opposing sides of said fuselage;

first and second chambers within said fuselage adjacent said first and second wings, respectively; and first and second wing parts telescopically movable from a first position within respective first and second chambers to a second position extending over at least a greater part of a width of said first and second wing from a respective leading edge to a respective trailing edge adjacent to said respective first and second wings.

* * * * *